US011301442B2

(12) United States Patent
Maunsell et al.

(10) Patent No.: US 11,301,442 B2
(45) Date of Patent: Apr. 12, 2022

(54) METHOD AND SYSTEM FOR USING ARRAY LEVEL TIME BUCKETS TO EFFICIENTLY CALCULATE TOP CONTRIBUTORS USING RELEVANT PERFORMANCE METRIC

(71) Applicant: EMC IP Holding Company LLC, Hopkinton, MA (US)

(72) Inventors: Caroline Maunsell, Cork (IE); Francisco Jaen, Cork (IE); Elizabeth Barrett, Cork (IE); Wioletta Stepniak, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 221 days.

(21) Appl. No.: 16/662,584

(22) Filed: Oct. 24, 2019

(65) Prior Publication Data
US 2021/0124721 A1    Apr. 29, 2021

(51) Int. Cl.
*G06F 16/21*    (2019.01)
*G06F 16/23*    (2019.01)
*G06F 16/22*    (2019.01)
*G06F 16/2458*    (2019.01)

(52) U.S. Cl.
CPC ........ *G06F 16/217* (2019.01); *G06F 16/2272* (2019.01); *G06F 16/2379* (2019.01); *G06F 16/2474* (2019.01)

(58) Field of Classification Search
CPC ............... G06F 16/217; G06F 16/2379; G06F 16/2272; G06F 16/2474
See application file for complete search history.

(56) References Cited

U.S. PATENT DOCUMENTS

| | | | | |
|---|---|---|---|---|
| 8,639,650 B1* | 1/2014 | Gill | ........................ | G06F 16/285 706/61 |
| 8,751,757 B1* | 6/2014 | Gaikwad | ............... | G06F 3/0611 711/156 |
| 9,665,288 B1* | 5/2017 | Aharoni | ................ | G06F 3/0649 |
| 10,089,773 B1* | 10/2018 | Haravu | ................. | G06T 11/206 |
| 10,223,190 B2* | 3/2019 | Noll | ..................... | H04L 67/1097 |
| 10,887,778 B2* | 1/2021 | Anand | .................. | H04M 15/41 |
| 2008/0320123 A1* | 12/2008 | Houlihan | .............. | G06F 9/5077 709/224 |
| 2011/0153603 A1* | 6/2011 | Adiba | ................. | G06F 16/2477 707/737 |
| 2016/0174081 A1* | 6/2016 | Lau | ....................... | G06F 16/904 455/457 |
| 2017/0310556 A1* | 10/2017 | Knowles | ............... | H04L 41/142 |
| 2020/0334687 A1* | 10/2020 | Ren | .................... | G06Q 30/0185 |

* cited by examiner

*Primary Examiner* — Huawen A Peng
(74) *Attorney, Agent, or Firm* — Chamberlain, Hrdlicka, White, Williams, & Aughtry (57) ABSTRACT

A method for managing data includes obtaining, by a data processor, a time bucket calculation request, and in response to the time bucket calculation request: obtaining a plurality of data points from a database based on a period of time, wherein the period of time is specified in the time bucket calculation request, processing each data point in the plurality of data points based on a timestamp of each data point and a data point interval, generating a plurality of time buckets based on the processing, and storing the plurality of time buckets in the database.

17 Claims, 7 Drawing Sheets

METHOD AND SYSTEM FOR USING ARRAY LEVEL TIME BUCKETS TO EFFICIENTLY CALCULATE TOP CONTRIBUTORS USING RELEVANT PERFORMANCE METRIC

BACKGROUND

Applications in a system may be configured to obtain data from or store data to storage devices. The process of storing and obtaining data may impact the overall system. The impact that each application and/or storage device has on the system may be calculated.

SUMMARY

In general, in one aspect, the invention relates to a method for managing data. The method includes obtaining, by a data processor, a time bucket calculation request, and in response to the time bucket calculation request: obtaining a plurality of data points from a database based on a period of time, wherein the period of time is specified in the time bucket calculation request, processing each data point in the plurality of data points based on a timestamp of each data point and a data point interval, generating a plurality of time buckets based on the processing, and storing the plurality of time buckets in the database.

In general, in one aspect, the invention relates to a non-transitory computer readable medium that includes computer readable program code, which when executed by a computer processor enables the computer processor to perform a method for managing data. The method includes obtaining, by a data processor, a time bucket calculation request, and in response to the time bucket calculation request: obtaining a plurality of data points from a database based on a period of time, wherein the period of time is specified in the time bucket calculation request, processing each data point in the plurality of data points based on a timestamp of each data point and a data point interval, generating a plurality of time buckets based on the processing, and storing the plurality of time buckets in the database.

In general, in one aspect, the invention relates to a system that includes a processor and memory that includes instructions, which when executed by the processor, perform a method, the method comprising: obtaining a time bucket calculation request, and in response to the time bucket calculation request: obtaining a plurality of data points from a database based on a period of time, wherein the period of time is specified in the time bucket calculation request, wherein each data point specifies a timestamp, a plurality of storage devices of a storage system, and metric data associated with the storage system, processing each data point in the plurality of data points based on a timestamp of each data point and a data point interval, generating a plurality of time buckets based on the processing, and storing the plurality of time buckets in the database.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for calculating top contributors in a distributed system. Embodiments of the invention include obtaining relevant data points for top contributors in a storage system at frequent time intervals. Embodiments of the invention identify contiguous data points and group them into time buckets to be used for calculations of top contributors to the storage system.

Further, embodiments of the invention include obtaining the time buckets to be used for calculating the top contributors of the system at a storage device level. The generation of the time buckets may minimize the communication between the data processor performing the calculation and the database storing the time buckets and/or metric data points.

Figure 1A:
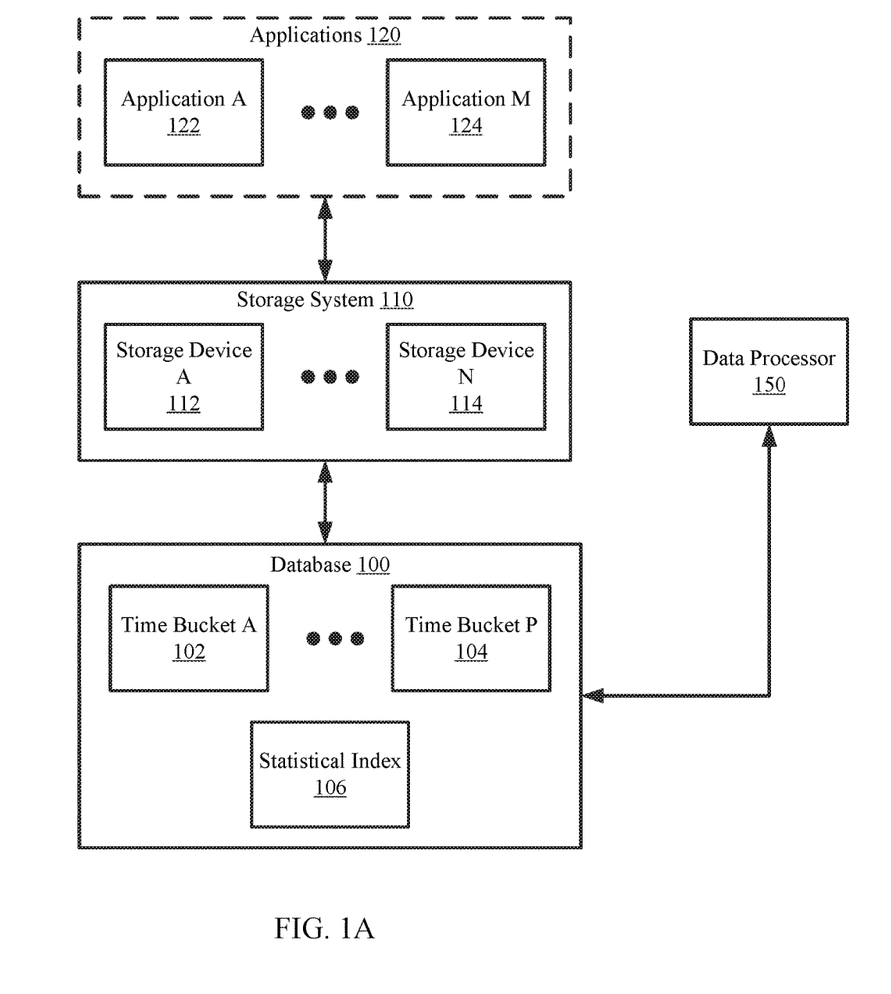
FIG. 1A shows a diagram of a system in accordance with one or more embodiments of the invention.

FIG. 1A shows a diagram of a system in accordance with one or more embodiments of the invention. The system includes one or more applications, (120), a storage system (110), a database (100), and a data processor (150). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, applications (120) utilize the storage system (110) to store and/or obtain data. The applications may write data to one or more storage devices (112, 114) and read data from the storage devices (112, 114). The data may be, for example, objects (e.g., files).

Figure 4:
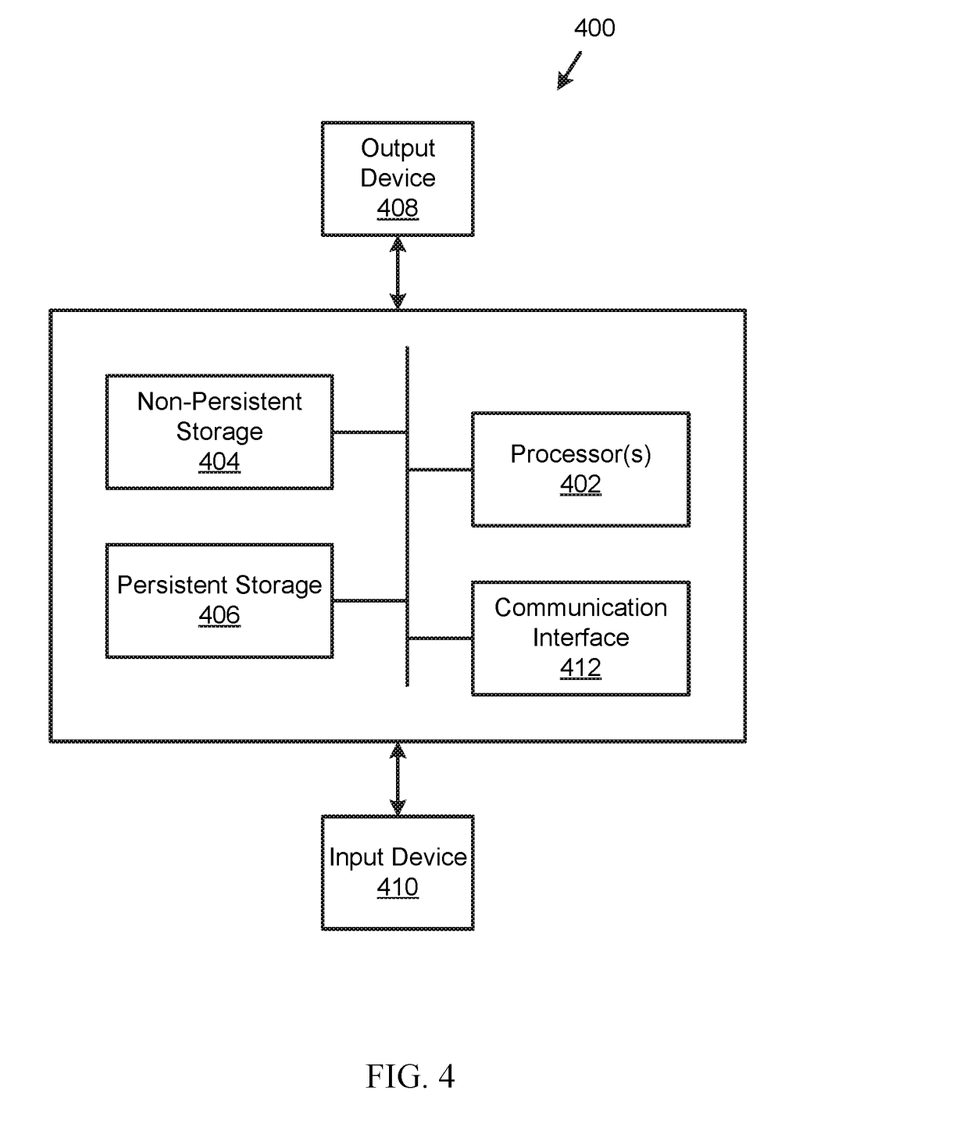
FIG. 4 shows a diagram of a computing device in accordance with one or more embodiments of the invention.

In one or more embodiments of the invention, each application (122, 124) is implemented on a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the application (122, 124) described in this application.

Each application (122, 124) may be implemented on a logical device without departing from the invention. The logical device utilizes computing resources of any number of physical computing devices to provide the functionality of the application (122, 124) described throughout this application.

In one or more embodiments of the invention, the storage system (110) is a system of storage devices (112, 114) that store higher level and/or lower-level objects used for storage. The storage system (110) may include one or more storage devices (112, 114). The storage devices each include functionality for storing the objects and/or providing the objects to the applications (120). The storage devices (112, 114) may each include functionality for providing metric data to the database (100). The metric data may specify, for example, the usage, performance, and/or other information associated with the storage devices (112, 114).

In one or more embodiments of the invention, each storage device (112, 114) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the storage device (112, 114) described throughout this application.

A storage device (112, 114) may be implemented as a logical device without departing from the invention. The logical device utilizes computing resources of any number of physical (or virtual) computing devices (see e.g., FIG. 4) to provide the functionality of the storage device (112, 114) described throughout this application. The logical device may be, for example, a virtual storage group.

In one or more embodiments of the invention, the storage system (110) provides data to be stored in the database (100). The data may be metric data. The metric data may be any type of data that may be used to analyze the performance of the storage system (110). The metric data may specify, for example, a data size stored in each storage device (112, 114), network connection speed between the storage devices (112, 114) and the applications (122, 124), a number of logical units (e.g., uniquely identified as logical unit numbers (LUNs)) that is associated with each storage device (112, 114), and/or any other information without departing from the invention.

In one or more embodiments of the invention, the metric data is provided on a storage system level. In other words, the storage system provides the metric data for all available storage devices (112, 114) that contribute to the overall performance of the storage system (110). If any one or more storage devices (112, 114) cannot be accessed to obtain metric data, the storage system (110) does not provide the metric data for any storage device (112, 114) in the system. In this manner, metric data for all available storage devices (112, 114) in the storage system (110) are to be provided to the database (100) for a data point; otherwise, metric data for none of the storage devices (112, 114) are provided.

In one or more embodiments of the invention, the metric data is not available for a storage device due to any number of causes. The causes may be, for example, lack of connection to the storage device, delayed response by the storage device in providing the metric data, and/or any other reasons without departing from the invention.

In one or more embodiments of the invention, the metric data is sent at a predetermined frequency. In one or more embodiments of the invention, the predetermined frequency may be specified in a data point interval. The data point interval may be predetermined by the database (100), by the data processor (150), and/or by any other entity without departing from the invention. In one or more embodiments of the invention, the data point interval is a period of time in which a data point is expected to be stored in the database (100). The data points are sent at least once after each data point interval's duration of time has elapsed. However, for reasons discussed above, the data point is not sent to the database (100) after every data point interval.

In one or more embodiments of the invention, each storage device (112, 114) may be identified using a storage device identifier. The storage device identifier may be, for example, a string of numbers, letters, symbols, and/or any combination thereof that uniquely identify the storage device (112, 114).

In one or more embodiments of the invention, the database (100) is a storage of metric data and/or statistical data generated using the metric data. The metric data may be stored as data points. Each data point may include metric data (also referred to as performance data) about the storage system (110) at a specified point in time. Various embodiments of metric data is further discussed in FIG. 1B.

In one or more embodiments of the invention, the data points are grouped into time buckets (102, 104). Each time bucket (102, 104) stores one or more contiguous data points that specify data points in which there is no time gaps. In one or more embodiments of the invention, a time gap is a period of time in which no metric data of the storage system is available. A time bucket (102, 104) may specify the start and end timestamps in which there is no time gap in metric data. For additional details regarding the time buckets, see, e.g., FIG. 1B.

In one or more embodiments of the invention, the database (100) further stores a statistical index. In one or more embodiments of the invention, the statistical index (106) is a data structure that specifies top contributors and/or missing contributors in the storage system (110). The statistical index may be generated based on calculations performed by the data processor (150) using the metric data. The statistical index may be generated using other data and/or data structures without departing from the invention.

In one or more embodiments of the invention, the database (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the database (100) described throughout this application.

In one or more embodiments of the invention, the database (100) is implemented as a logical device. The logical device may utilize computing resources of any number of physical computing devices to provide the functionality of the database (100) described throughout this application.

In one or more embodiments of the invention, the data processor (150) performs calculations based on data stored in the database (100). The calculations may include, for example, calculating time buckets (e.g., 102, 104) and/or calculating top contributors using the statistical index (106) and the time buckets (102, 104). The time buckets may be calculated, or otherwise generated, using the method illustrated in FIG. 2A. Further, the top contributors may be calculated using the method illustrated in FIG. 2B. The aforementioned calculations may be performed via other methods without departing from the invention.

In one or more embodiments of the invention, the data processor (150) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data processor (150) described throughout this application and/or all, or a portion thereof, of the method illustrated in FIG. 2A-2B.

The data processor (150) may be implemented as a logical device without departing from the invention. The logical device utilizes computing resources of any number of physical computing devices to provide the functionality of the data processor (150) described throughout this application.

Figure 1B:
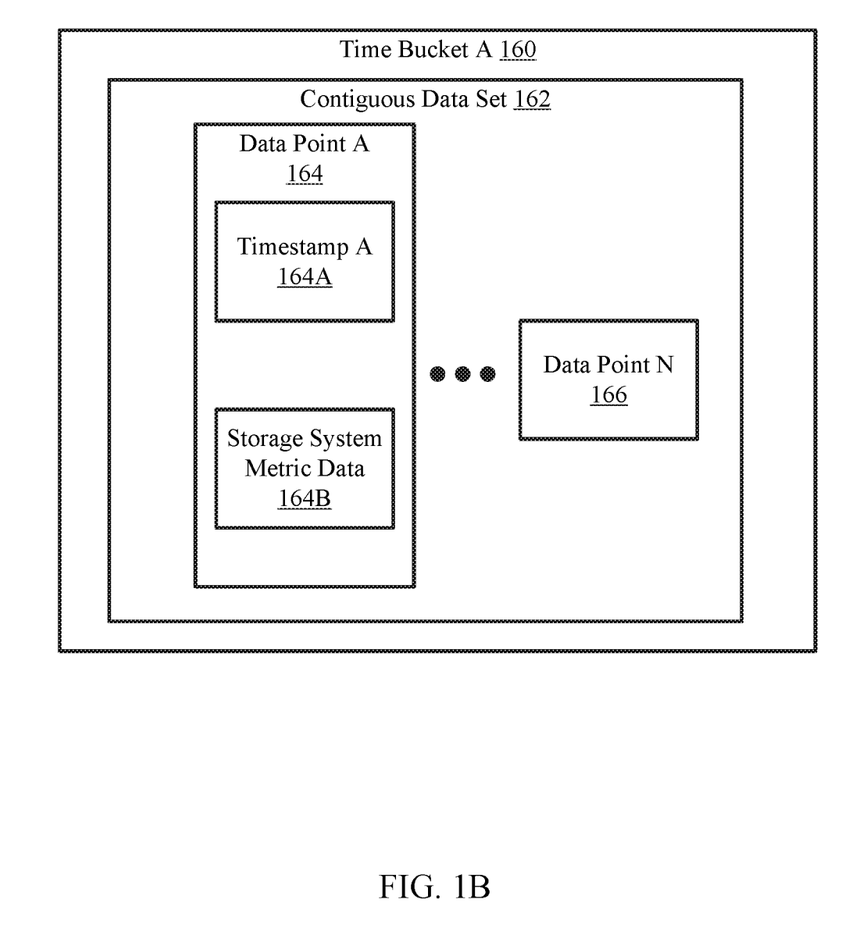
FIG. 1B shows a diagram of time buckets in accordance with one or more embodiments of the invention.

FIG. 1B shows a diagram of a time bucket in accordance with one or more embodiments of the invention. The time bucket (160) shown in FIG. 1B may be an embodiment of a time bucket (102, 104, FIG. 1A) discussed above. As discussed above, the time bucket is a data structure that is used for statistical calculations. The time bucket (160) may include a contiguous data set (162). Each data point (164, 166) in the contiguous data set (162) may include a timestamp (164A) and metric data (164B) associated with the storage system (e.g., 110, FIG. 1A) discussed above. The time bucket (160) may include additional, fewer, and/or different portions without departing from the invention. Each of the aforementioned portions of the time bucket (160) is discussed below.

In one or more embodiments of the invention, the contiguous data set (162) is a set of data points (164, 166) that are each associated with a continuous period of time in which there is metric data available for the storage system. The continuity of the data points (164, 166) may be determined based on the timestamps (164A) of each data point.

For example, suppose a database (e.g., 100, FIG. 1A) is obtaining data points for a storage system at an interval of every five minutes. At a time T=0, a first data point is obtained. At a second time T=T1, five minutes later, a second data point is obtained, at a third point in time T=T2, five minutes after T2, a third data point is obtained. At a fourth point in time, T=T3, a data point is not obtained. Because a data point is not obtained at T3, any data points obtained after T3 are not continuous with the data points obtained at times T0, T1, and T2. Based on these timestamps, the data points obtained in times T0, T1, and T2 are continuous. In such manner, a time bucket specifies the data points obtained at times T0, T1, and T2 and no data points obtained afterwards.

In one or more embodiments of the invention, the time bucket (160) may only specify the first and the last data points (164, 166) in a contiguous data set.

Figure 2A:
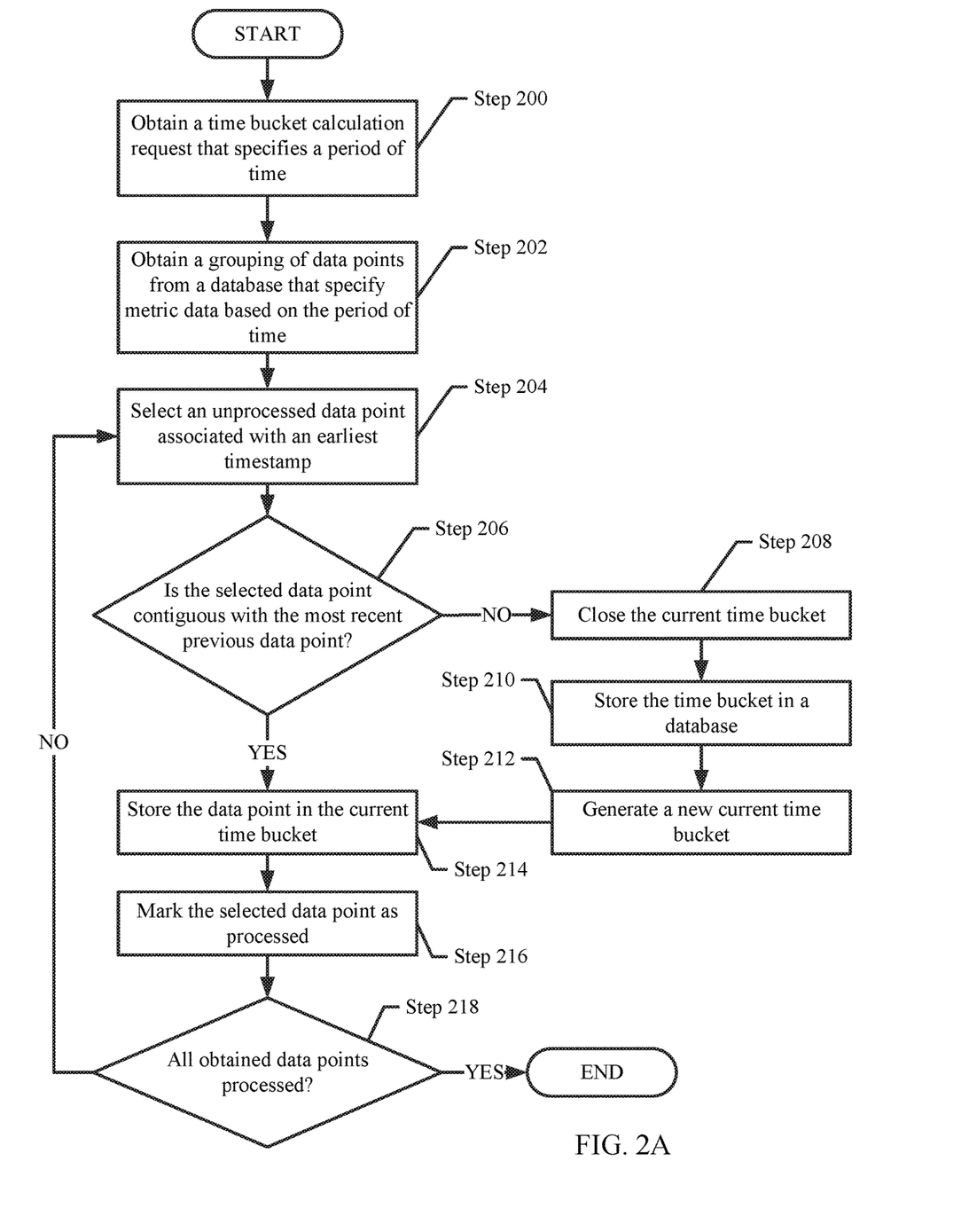
FIG. 2A shows a flowchart for obtaining time buckets in accordance with one or more embodiments of the invention.
Figure 2B:
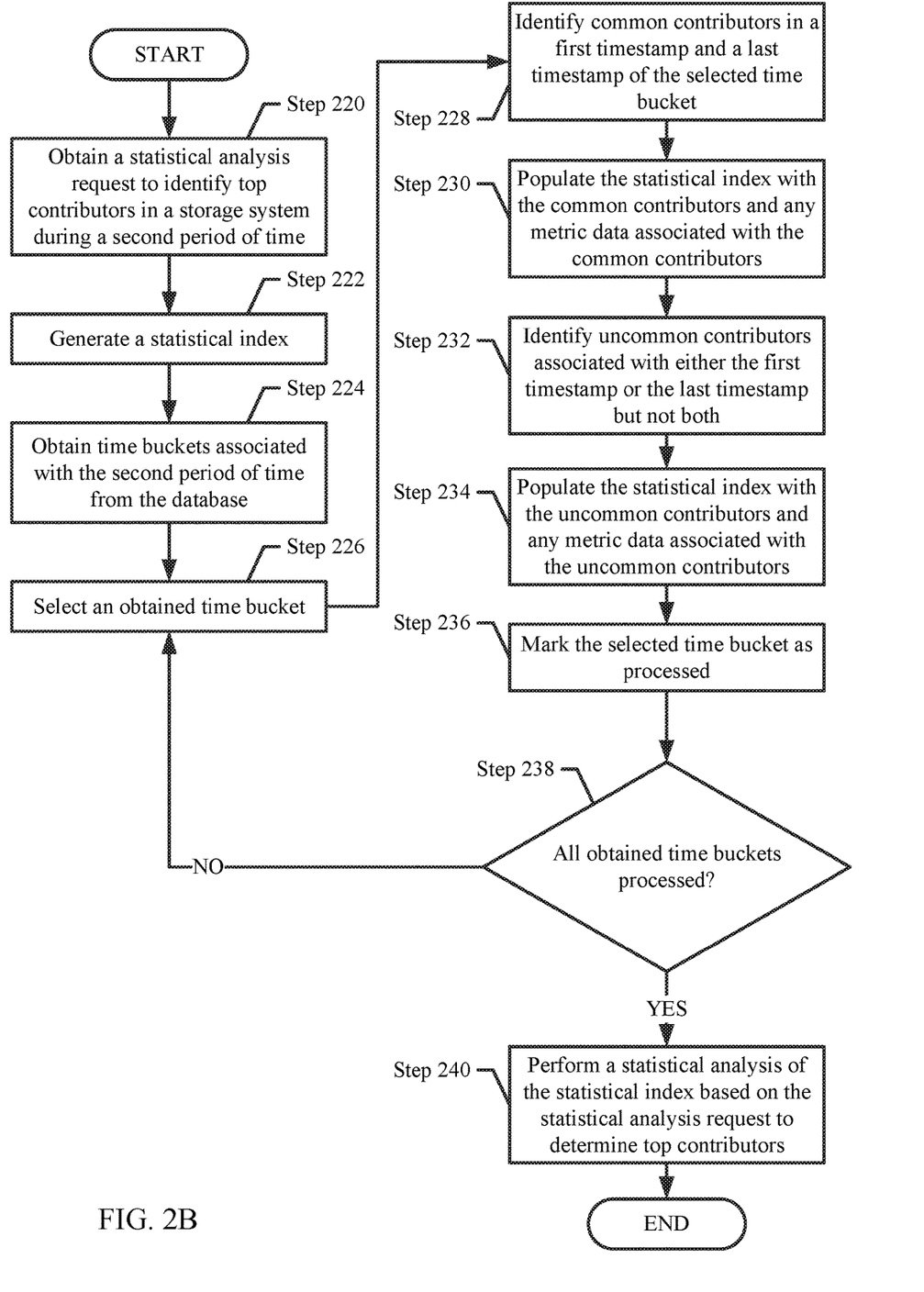
FIG. 2B shows a flowchart for calculating top contributors in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for obtaining time buckets in accordance with one or more embodiments of the invention. The method shown in FIG. 2A may be performed by, for example, a data processor (150, FIG. 1A). Other components of the system illustrated in FIG. 1A may perform the method of FIG. 2A without departing from the invention.

Turning to FIG. 2A, a time bucket calculation request is obtained. The time bucket calculation request may be obtained from an application, a storage device in the storage system, and/or any other entity, which may or may not be illustrated in FIG. 1A.

In one or more embodiments of the invention, the time bucket calculation request is obtained in response to a policy implemented by the data processor in which a time bucket schedule is enforced in which time buckets are calculated after certain time periods. The time periods may be larger than the time periods in which data points are to be obtained. For example, if data points are scheduled to be obtained at a data point interval of every five minutes, time bucket calculations may be scheduled for every hour, every 24 hours, every week, etc.

In one or more embodiments of the invention, the time bucket calculation specifies a period of time. The data may be associated with the period of time based on the timestamps of the data points stored in the database. The period of time may be, for example, the period of time since the last time bucket calculation was performed.

For example, if the last time a time bucket calculation was performed was 24 hours ago, the time bucket calculation may specify that the time buckets are to be generated for data associated with timestamps that are within the last 24 hours.

In step 202, a grouping of data points associated with the period of time is obtained from a database. In one or more embodiments of the invention, the grouping is obtained by sending a data point request to the database that specifies all data points stored in the database that are associated with a timestamp that is within the specified period of time in the time bucket calculation request. The request may prompt the database to search for all data points associated with the specified period of time.

In step 204, an unprocessed data point is selected associated with an earliest timestamp. In this manner, the data points may be processed in an order of descending age according to the corresponding timestamps.

In step 206, a determination is made about whether the selected data point is contiguous with the most recent previous data point. In one or more embodiments of the invention, the selected data point is deemed contiguous with the most recent previous data point if the timestamp of the most recent previously processed data point is within a scheduled data point time interval of the selected data point. For example, if a data point interval is one minute, the data processor determines whether the most recent previously processed data point is associated with a timestamp that is only one minute, or less, older than the timestamp of the selected data point.

If the selected data point is contiguous with the most recent previous data point, the method proceeds to step 208; otherwise, the method proceeds to step 214. Additionally, if the selected data point is the first processed data point in the grouping, the method proceeds to step 208.

In step 208, following the determination that the selected data point is not contiguous with a most recent previous data point, the current time bucket is closed. In one or more embodiments of the invention, if the selected data point is the first processed data point of the grouping of data points, step 208 is omitted as a current time bucket has not been generated.

In step 210, the time bucket of step 208 is stored in the database. In one or more embodiments of the invention, if the selected data point is the first processed data point of the grouping of data points, step 210 is omitted as a current time bucket has not been generated.

In one or more embodiments of the invention, step 210 is performed for all time buckets after all obtained data points have been processed.

In step 212, a new current time bucket is generated.

In step 214, the selected data point is stored in the current time bucket. In one or more embodiments of the invention, the current time bucket is populated with the selected data point. The timestamp and/or the metric data of the storage system may be included in the time bucket.

In one or more embodiments of the invention, the data point is not included in the time bucket if the data point is not the first data point or the last data point in the current time bucket. In one or more embodiments of the invention, the first data point is the first data point to be stored in the time bucket. This first data point may include a timestamp that is older than the timestamps of the other data points in the time bucket. In contrast, the last data point is the last data point to be stored in the time bucket. The last data point may include a timestamp that is newer than the timestamps of the other data points in the time bucket.

In such embodiments, prior to storing the time bucket in the database, the data processor deletes the intermediate data points (i.e., any data points in the current time bucket that are not the first or the last data points).

In step 216, the selected data point is marked as processed.

In step 218, a determination is made about whether all obtained data points are processed. If all obtained data points are processed, the method ends following step 218; otherwise, the method proceeds to step 204.

FIG. 2B shows a flowchart for calculating top contributors in accordance with one or more embodiments of the invention. The method shown in FIG. 2B may be performed by, for example, a data processor (150, FIG. 1A). Other components of the system illustrated in FIG. 1A may perform the method of FIG. 2B without departing from the invention.

In step 220, a statistical analysis request is obtained. In one or more embodiments of the invention, the statistical analysis request specifies performing a calculation to identify the top contributors in a storage system during a second period of time.

In step 222, a statistical index is generated. In one or more embodiments of the invention, the statistical index may be later populated with information associated with each storage device.

In step 224, time buckets associated with the second period of time are obtained from the database. In one or more embodiments of the invention, each time bucket specifies at least a first and last data point in which intermediate data points are contiguous to each other. The data processor may identify the time buckets for which the timestamps of the first and last data points are within the second period of time specified in the statistical analysis request. The identified time bucket(s) are obtained from the database.

In step 226, an obtained time bucket is selected.

In step 228, common contributors associated with the selected time bucket are identified. In one or more embodiments of the invention, a common contributor is a storage device that is specified in both the first and the last data point of a time bucket. The common contributors of the selected time bucket are identified by identifying the first data point (i.e., the data point with the oldest timestamp) and the last data point (i.e., the data point with the newest timestamp) of the selected time bucket and identifying the storage devices that are specified in both the identified first data point and the last data point.

In step 230, the statistical index is populated with the identified common contributors and any metric data associated with the common contributors. In one or more embodiments of the invention, the statistical index is populated by including the identified common contributors of step 228 in the statistical index and identifying any metric data associated with the common contributors and including the metric data in the statistical index.

In step 232, uncommon contributors are identified based on the selected time bucket. In one or more embodiments of the invention, an uncommon contributor is a storage device that is specified in either the first or the last data point of a time bucket, but not in both. The uncommon contributors of the selected time bucket are identified by identifying the first data point (i.e., the data point with the oldest timestamp) and the last data point (i.e., the data point with the newest timestamp) of the selected time bucket and identifying the storage devices that are specified in one of either the identified first data point and the last data point but not specified in both.

In one or more embodiments of the invention, the specified storage devices may include different storage devices due to the storage devices being added (e.g., a new storage group is generated with a new logical unit number (LUN)) and/or storage groups being removed from the storage system during points in time between the first and last data points.

In step 234, the statistical index is populated with the identified uncommon contributors and any metric data associated with the uncommon contributors. In one or more embodiments of the invention, the statistical index is populated by including the identified uncommon contributors of step 232 in the statistical index and identifying any metric data associated with the common contributors and including the metric data in the statistical index.

In one or more embodiments of the invention, prior to populating the statistical index, the data processor identifies a time period in which each uncommon contributor is specified. For example, if a time bucket specifies data points A, B, C, and D, and an uncommon contributor is only specified in data points C and D, then the time period of the uncommon contributor is the time period between timestamps of data points C and D. The identified time period may be included in the statistical index.

In step 236, the selected time bucket is marked as processed.

In step 238, a determination is made about whether all obtained time buckets are processed. If all obtained time buckets are processed, the method proceeds to step 240; otherwise, the method proceeds to step 226.

In step 240, a statistical analysis is performed using the statistical index based on the statistical analysis request. In one or more embodiments of the invention, the statistical analysis is a calculation of the top contributors in the storage system using metric data stored in the statistical index. The statistical analysis may analyze each common contributor of each time bucket and determine an amount that the storage device affects the performance of the storage system.

For example, metric data may specify a size of data stored in a common contributor throughout the time period of a time bucket. If the size of the data changes throughout the time period, this change in size may be used to calculate an average write rate of the common contributor. The write rate of the common contributor may affect the performance of the storage system (e.g., a high write rate of one common contributor may reduce the overall network speed of other storage devices in the storage system to the applications writing data). The write rates may be calculated for the common contributors and other uncommon contributors specified in the statistical index.

Other calculations may be performed in the statistical analysis without departing from the invention.

In one or more embodiments of the invention, after the statistical analysis is performed, any number of actions may be performed to improve the workload of the storage system based on the results of the statistical analysis. For example, after the top contributors in the system are identified, a workload rebalancing may be performed that reduces the workload on the top contributors and distributes the workload to storage devices that do not contribute as much to the storage system. In this manner, the performance of the storage system may be optimized.

Example

The following section describes an example. The example, illustrated in FIGS. 3A-3B, is not intended to limit the invention.

Figure 3A:
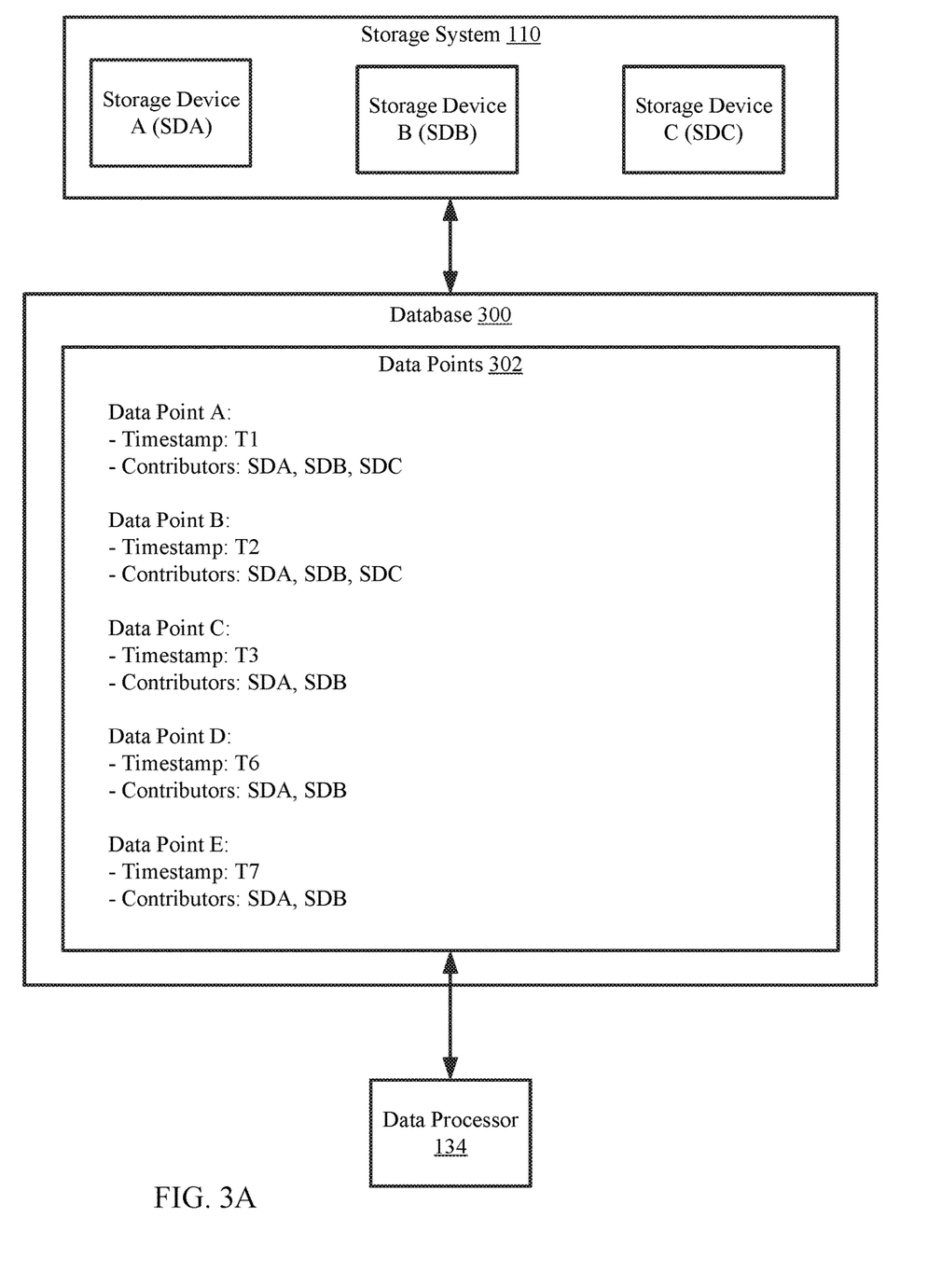
FIGS. 3A-3B show an example in accordance with one or more embodiments of the invention.
Figure 3B:
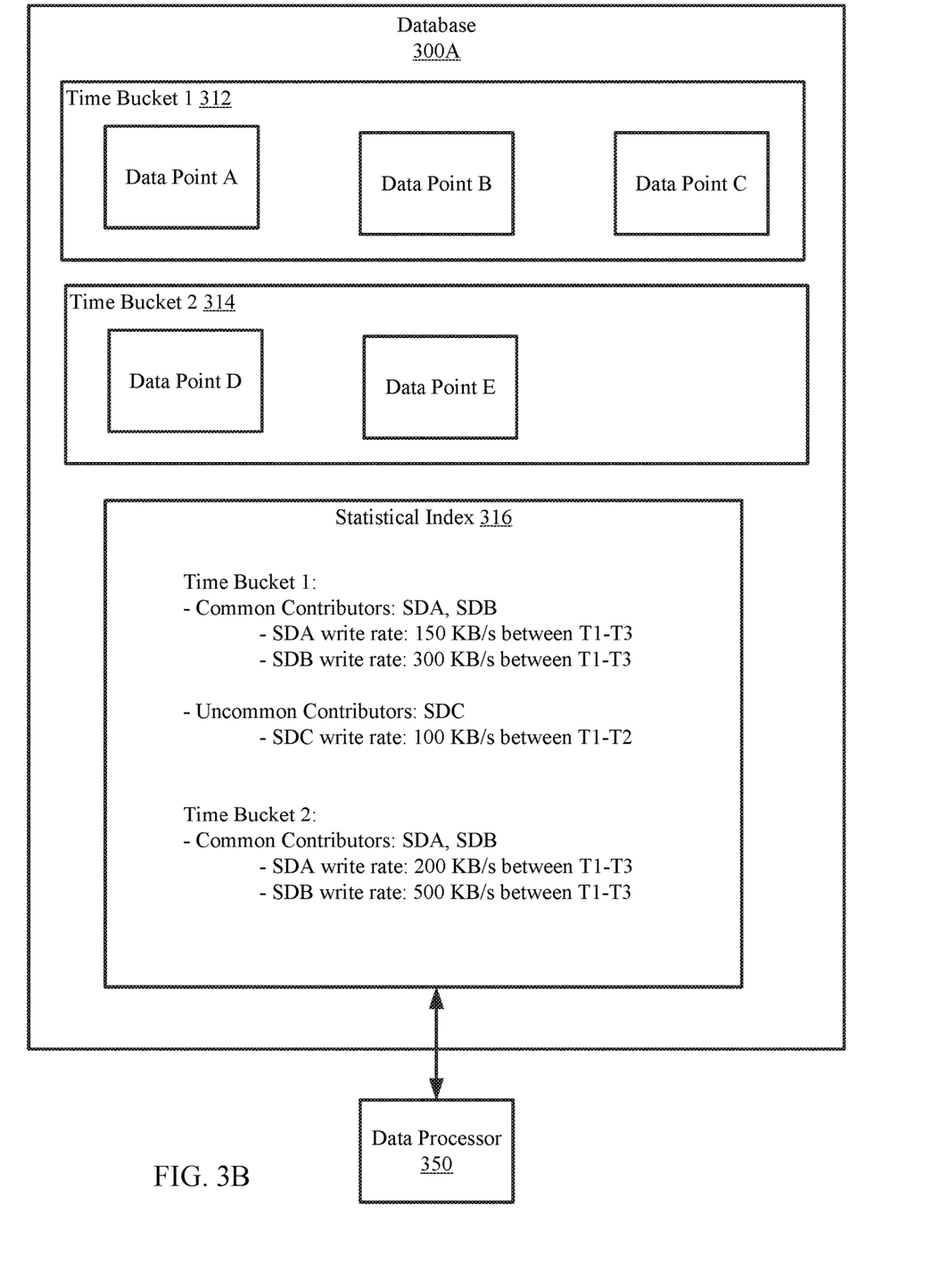

FIG. 3A shows an example system in accordance with one or more embodiments of the invention. The system includes a storage system (310), a database (300), and a data processor (350). The storage system (310) includes three storage devices: storage device A (SDA), storage device B (SDB), and storage device C (SDC). Each storage device (SDA, SDB, SDC) stores data associated with applications (not shown).

The storage system (110) sends metric data associated with contributors to the storage system (110) to the database (300). The data points may specify which storage devices (SDA, SDB, SDB) contributed to the performance of the storage system (310) during several points in time. The data points are generated on a storage system level (i.e., in contrast to a per-storage device level). The data points are expected to be sent at a data point interval of one minute.

At time T1, data point A is sent that specifies SDA, SDB, and SDC as contributors to the performance of the storage system. The data point at time T1 includes additional information about each storage device (SDA, SDB, SDC) that contributes to the performance of the storage system. For example, the data point specifies a write rate in which data is written to a disk in each storage device at the time T1.

At time T2, one minute after T1, data point B is sent that specifies SDA, SDB, and SDC as contributors to the performance of the storage system.

At time T3, one minute after T2, data point C is sent that specifies SDA and SDB as contributors to the performance of the storage system. At some point in time between T2 and T3, SDC no longer contributes to the performance of storage system (310). This may be reflected by data point C, in which SDC is not specified as a contributor.

At time T4, one minute after T3, the storage system (310) is unable to determine whether SDA contributes to the performance of the storage system (310). Subsequently, the storage system (310) does not have any performance data to send to the database (300) at this point in time.

At time T5, one minute after T4, the storage system (310) is unable to determine whether SDA contributes to the performance of the storage system (310). Subsequently, the storage system (310) does not have any performance data to send to the database (300) at this point in time.

At time T6, one minute after T5, data point D is sent that specifies SDA and SDB as contributors to the performance of the storage system (310).

At time T7, one minute after T6, data point E is sent that specifies SDA and SDB as contributors to the performance of the storage system (310).

FIG. 3B shows a diagram of the system at a later point in time. The system shows the database (300A) at a later point in time. The database (300A) stores two time buckets (312, 314) that have been generated by the data processor (350) in accordance with FIG. 2A. The time buckets are generated in response to a policy to calculate time buckets every hour.

The data processor (350), performing the method of FIG. 2A, identifies a time period in which the data points are to be processed. The time period, specified in a time bucket calculation request, specifies the time period since the last time bucket calculation was performed. The time period is the previous hour.

The data processor (350) communicates with the database (e.g., through a command call sent to the database (300)) to obtain the data points that include a timestamp that is within the specified time period. The data processor (350), as a result of the communication, obtains data points A, B, C, D, and E.

The data processor (350), further following the method of FIG. 2A, processes each data point in an order from oldest timestamp (i.e., data point A) to the newest timestamp (i.e., data point E).

Specifically, the data processor (350) first selects data point A, identifies it as the first data point, and generates a time bucket 1 and stores data point in time bucket 1 (312).

The data processor (350) then selects data point B, determines that data point B is contiguous with the previous most recently processed data point (i.e., data point A), and, based on the determination, stores data point B in time bucket 1 (312).

The data processor (350) then selects data point C, determines that data point C is contiguous with the previous most recently processed data point (i.e., data point B), and, based on the determination, stores data point C in time bucket 1 (312).

The data processor (350) then selects data point D, determines that data point D is not contiguous with the previous most recently processed data point (i.e., data point C). Data point D is not contiguous with data point C because there is a three minute gap between the timestamp of data point C and data point D, which is greater than the one minute data point interval. Based on the determination, the data processor (350) stores time bucket 1 (312) in the database (300), generates time bucket 2 (314), and stores data point B in time bucket 2 (314).

The data processor (350) then selects data point E, determines that data point E is contiguous with the previous most recently processed data point (i.e., data point D), and, based on the determination, stores data point E in time bucket 2 (314). After all data points are processed, time bucket 2 (314) is stored in the database (300).

At a point in time after the time buckets (312, 314) have been calculated, a request to calculate the top contributors to the storage system is obtained by the data processor (350). The data processor (350), in response to the request, performs the method of FIG. 3B to identify the top contributor to the performance of the storage system.

The method includes obtaining the time buckets (312, 314) and identifying the common contributors and uncommon contributors of each time bucket. For time bucket 1 (312), the common contributors are identified by identifying the storage devices specified in both the first data point (i.e., data point A) and the last data point (i.e., data point C) in the time bucket (312). The common contributors are identified as SDA and SDB. For time bucket 2 (314), the common contributors are also SDA and SDB.

Continuing the method of FIG. 3B, the data processor (350) further identifies the uncommon contributors for each time bucket. The uncommon contributors are defined as the storage devices that are not specified in both the first data point and the last data point of each time bucket. For time bucket 1 (312), the uncommon contributor is SDC. For time bucket 2 (314), there is no uncommon contributor.

After identifying each common contributor and uncommon contributor of each time bucket, the data processor includes this information in a statistical index (316) of the database (300A). Further, the statistical index (316) includes the additional metric data associated with each common and uncommon contributor in the storage system. The metric data is a write rate in which data is written to each common and uncommon contributor during the corresponding time period.

The data processor, after generating and populating the statistical index (316), performs a statistical analysis on the statistical index (316) to calculate the top contributors to the storage system. The top contributors are identified as SDA and SDB, with SDB contributing more to the write rate of the overall storage system than SDA and SDC.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of calculating the effects that sub-level storage devices have on a storage system by reducing the number of commands that are performed on a database to obtain the required information for performing the calculations. The number of commands are reduced by first obtaining all high-level data points associated with the storage system in one command, grouping the data points into time buckets based on contiguous data, and storing the time buckets in the database.

Further, embodiments of the invention obtain the relevant data by obtaining the time buckets and performing calculations on the extreme ends of each time buckets. In this manner, accuracy of the calculations are maintained while the communication between a data processor performing the calculations and the database storing the statistical data is reduced.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
    obtaining, by a data processor, a time bucket calculation request; and
    in response to the time bucket calculation request:
        obtaining a plurality of data points from a database based on a period of time, wherein the period of time is specified in the time bucket calculation request;
        processing each data point in the plurality of data points based on a timestamp of each data point and a data point interval;

generating a plurality of time buckets based on the processing;
storing the plurality of time buckets in the database;
after the storing, obtaining, by the data processor, a statistical analysis request;
in response to the statistical analysis request:
obtaining a second plurality of time buckets from the plurality of time buckets based on a second period of time, wherein the second period of time is specified in the statistical analysis request;
identifying a common contributor of a time bucket in the second plurality of time buckets, wherein the common contributor is identified by comparing a first data point of the time bucket to a second data point of the time bucket to determine that the common contributor is specified in both the first data point and the second data point;
identifying an uncommon contributor in a second time bucket in the second plurality of time buckets, wherein the uncommon contributor is identified by comparing a third data point of the second time bucket to a fourth data point of the second time bucket to determine that the uncommon contributor is specified in the third data point and not specified in the fourth data point;
populating a statistical index based on the common contributor and the uncommon contributor;
performing a statistical analysis based on the statistical index; and
identifying at least one top contributor based on the statistical analysis.

2. The method of claim 1, wherein each data point further specifies a timestamp, a plurality of storage devices of a storage system, and metric data associated with the storage system.

3. The method of claim 2, wherein the common contributor and the uncommon contributor are each a storage device of the plurality of storage devices.

4. The method of claim 1, wherein the storage system is scheduled to send a data point to the database after a data point interval has elapsed.

5. The method of claim 1, wherein each time bucket of the plurality of time buckets specifies a contiguous data set.

6. The method of claim 5, wherein the contiguous data set comprises a portion of the plurality of data points.

7. The method of claim 1, wherein performing the statistical analysis comprises:
identifying at least one most frequent common contributor specified in the statistical index;
analyzing metric data associated with the at least one most frequent common contributor; and
making a determination, based on the metric data, that the at least one most frequent common contributor is the at least one top contributor.

8. A non-transitory computer readable medium comprising computer readable program code, which when executed by a computer processor enables the computer processor to perform a method, the method comprising:
obtaining, by a data processor, a time bucket calculation request; and
in response to the time bucket calculation request:
obtaining a plurality of data points from a database based on a period of time, wherein the period of time is specified in the time bucket calculation request;
processing each data point in the plurality of data points based on a timestamp of each data point and a data point interval;
generating a plurality of time buckets based on the processing; and
storing the plurality of time buckets in the database;
after the storing, obtaining, by the data processor, a statistical analysis request;
in response to the statistical analysis request:
obtaining a second plurality of time buckets from the plurality of time buckets based on a second period of time, wherein the second period of time is specified in the statistical analysis request;
identifying a common contributor of a time bucket in the second plurality of time buckets, wherein the common contributor is identified by comparing a first data point of the time bucket to a second data point of the time bucket to determine that the common contributor is specified in both the first data point and the second data point;
identifying an uncommon contributor in a second time bucket in the second plurality of time buckets, wherein the uncommon contributor is identified by comparing a third data point of the second time bucket to a fourth data point of the second time bucket to determine that the uncommon contributor is specified in the third data point and not specified in the fourth data point;
populating a statistical index based on the common contributor and the uncommon contributor;
performing a statistical analysis based on the statistical index; and
identifying at least one top contributor based on the statistical analysis.

9. The non-transitory computer readable medium of claim 8, wherein each data point further specifies a timestamp, a plurality of storage devices of a storage system, and metric data associated with the storage system.

10. The non-transitory computer readable medium of claim 9, wherein the common contributor and the uncommon contributor are each a storage device of the plurality of storage devices.

11. The non-transitory computer readable medium of claim 8, wherein the storage system is scheduled to send a data point to the database after a data point interval has elapsed.

12. The non-transitory computer readable medium of claim 8, wherein each time bucket specifies a contiguous data set.

13. The non-transitory computer readable medium of claim 12, wherein the contiguous data set comprises a portion of the plurality of data points.

14. The non-transitory computer readable medium of claim 8, wherein performing the statistical analysis comprises:
identifying at least one most frequent common contributor specified in the statistical index;
analyzing metric data associated with the at least one most frequent common contributor; and
making a determination, based on the metric data, that the at least one most frequent common contributor is a top contributor.

15. A system, comprising:
a processor;
memory comprising instructions, which when executed by the processor, perform a method, the method comprising:
obtaining a time bucket calculation request; and
in response to the time bucket calculation request:

obtaining a plurality of data points from a database based on a period of time, wherein the period of time is specified in the time bucket calculation request, wherein each data point specifies a timestamp, a plurality of storage devices of a storage system, and metric data associated with the storage system;

processing each data point in the plurality of data points based on a timestamp of each data point and a data point interval;

generating a plurality of time buckets based on the processing; and storing the plurality of time buckets in the database;

after the storing, obtaining, by the data processor, a statistical analysis request;

in response to the statistical analysis request:

obtaining a second plurality of time buckets from the plurality of time buckets based on a second period of time, wherein the second period of time is specified in the statistical analysis request;

identifying a common contributor of a time bucket in the second plurality of time buckets, wherein the common contributor is identified by comparing a first data point of the time bucket to a second data point of the time bucket to determine that the common contributor is specified in both the first data point and the second data point;

identifying an uncommon contributor in a second time bucket in the second plurality of time buckets, wherein the uncommon contributor is identified by comparing a third data point of the second time bucket to a fourth data point of the second time bucket to determine that the uncommon contributor is specified in the third data point and not specified in the fourth data point;

populating a statistical index based on the common contributor and the uncommon contributor;

performing a statistical analysis based on the statistical index; and identifying at least one top contributor based on the statistical analysis.

16. The system of claim 15, wherein the common contributor and the uncommon contributor are each a storage device of the plurality of storage devices, and wherein the storage system is scheduled to send a data point to the database after a data point interval has elapsed.

17. The system of claim 9, wherein performing the statistical analysis comprises:

identifying at least one most frequent common contributor specified in the statistical index;

analyzing metric data associated with the at least one most frequent common contributor; and making a determination, based on the metric data, that the at least one most frequent common contributor is a top contributor.

* * * * *